(12) United States Patent
Fukagawa

(10) Patent No.: US 8,605,598 B2
(45) Date of Patent: Dec. 10, 2013

(54) FRAME LOSS MEASUREMENT METHOD, SYSTEM, AND APPARATUS

(75) Inventor: Takashi Fukagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 486 days.

(21) Appl. No.: 12/845,252

(22) Filed: Jul. 28, 2010

(65) Prior Publication Data
US 2010/0302949 A1    Dec. 2, 2010

Related U.S. Application Data

(63) Continuation of application No. PCT/JP2008/051870, filed on Feb. 5, 2008.

(51) Int. Cl.
*G01R 31/08* (2006.01)
*H04L 12/26* (2006.01)

(52) U.S. Cl.
CPC ................................ *H04L 43/0811* (2013.01)
USPC ...................................................... 370/241.1

(58) Field of Classification Search
CPC .................................................. H04L 43/0811
USPC ........................................................ 370/241.1
See application file for complete search history.

(56) References Cited

U.S. PATENT DOCUMENTS

| | | | |
|---|---|---|---|
| 6,181,680 B1* | 1/2001 | Nagata et al. ................. | 370/248 |
| 6,278,710 B1 | 8/2001 | Eidson | |
| 2005/0099952 A1 | 5/2005 | Mohan et al. | |
| 2005/0185577 A1* | 8/2005 | Sakamoto et al. ............ | 370/218 |
| 2006/0072539 A1 | 4/2006 | Busch | |
| 2006/0092847 A1* | 5/2006 | Mohan ........................ | 370/241.1 |
| 2007/0064611 A1* | 3/2007 | He .............................. | 370/236.2 |
| 2008/0031146 A1* | 2/2008 | Kwak et al. .................. | 370/250 |
| 2008/0049757 A1* | 2/2008 | Bugenhagen ............... | 370/395.1 |

(Continued)

FOREIGN PATENT DOCUMENTS

| | | |
|---|---|---|
| JP | 2000-99485 | 4/2000 |
| JP | 2005-528826 | 9/2005 |

(Continued)

OTHER PUBLICATIONS

Chinese Office Action issued Aug. 13, 2012 in corresponding Chinese Patent Application No. 200880125406.5.

(Continued)

*Primary Examiner* — Phuongchau B Nguyen
(74) *Attorney, Agent, or Firm* — Staas & Halsey LLP

(57) ABSTRACT

The number of data frames transmitted between two apparatuses is counted by a transmission counter, while the number of received frames is counted by a reception counter. When an OAM frame for frame loss measurement is transmitted, the value of the transmission counter is cached in a cache memory. At the time of generation of an OAM frame at an OAM frame generation unit, the value of the cache memory is used so as to generate an OAM frame carrying the value of the transmission counter at the time of transmission of the OAM frame transmitted previously. The frame loss is calculated from the difference of the value of the transmission counter carried in the OAM frame from the previous value and the difference of the value of the reception counter at the time of reception of the previous previous OAM frame from the previous value.

18 Claims, 9 Drawing Sheets

(56) References Cited

U.S. PATENT DOCUMENTS

| | | | |
|---|---|---|---|
| 2008/0159291 A1* | 7/2008 | Sultan et al. | 370/392 |
| 2008/0219173 A1 | 9/2008 | Yoshida et al. | |
| 2010/0020698 A1* | 1/2010 | Kondo | 370/241.1 |
| 2010/0302949 A1* | 12/2010 | Fukagawa | 370/241.1 |
| 2011/0188380 A1* | 8/2011 | Song et al. | 370/241.1 |

FOREIGN PATENT DOCUMENTS

| | | |
|---|---|---|
| JP | 2008-227757 | 9/2008 |
| WO | 03/092196 A1 | 11/2003 |
| WO | 2006/043624 A1 | 4/2006 |

OTHER PUBLICATIONS

"OAM functions and mechanisms for Ethernet based networks", ITU-T Recomendation Y.1731, Global Information Infrastructure, Internet Protocol Aspects and Next-Generation Networks, May 2006, pp. 10, 25-30.

European Search Report dated Dec. 7, 2011 issued in corresponding European Patent Application No. 08710802.3.

"OAM functions and mechanisms for Ethernet based networks," ITU-T Y.1731 Telecommunication Standardization Sector of ITU, International Telecommunication Union, May 2006, 1 page.

International Search Report for PCT/JP2008/051870, mailed on May 13, 2008.

* cited by examiner

FRAME LOSS MEASUREMENT METHOD, SYSTEM, AND APPARATUS

CROSS-REFERENCE TO RELATED APPLICATION

This application is a continuation application based on International Application No. PCT/JP2008/051870, filed on Feb. 5, 2008, the contents being incorporated herein by reference.

FIELD

The embodiments discussed herein are related to a method and system for measurement of frame loss or packet loss which is one of the indicators showing the quality of a path set on a network, and an apparatus used for the same. Below, frames and packets will be referred to all together as "frames" and frame loss and packet loss will be referred to all together as "frame loss".

BACKGROUND

As a method for measurement of frame loss of a path set on a network, ITU-T Recommendation Y.1731 discloses in section 8.1 the measurement of frame loss of a service path set on the Ethernet® (ETH-LM: Ethernet® Loss Measurement). In the disclosed ETH-LM, the number of frames transmitted at a transmission side MEP (maintenance entity group end point) is counted by a transmission counter. Further, an OAM (operation, administration, and maintenance) frame carrying the value of the transmission counter is added to the data stream at a period of about 100 msec. The reception side MEP counts the number of received frames by a reception counter and compares the difference of the reception counter value at the time of reception of the OAM frame from the time of reception of the previous OAM frame and the difference of the transmission counter value contained in the OAM frame from that previous value so as to calculate the frame loss.

This literature discloses the two techniques of dual ended ETH-LM and single ended ETH-LM. The dual ended ETM-LM uses a CCM (continuity check message) frame as an OAM frame and sends the CCM frames from both MEPs constantly to the other MEPs by a predetermined period and measures the frame loss in both directions at both MEPs. The single ended ETH-LM uses an LMM (loss measurement message) frame and a reply to the same, that is, LMR (loss measurement reply) frame, as OAM frames, and send an LMM frame from one MEP to the other MEP periodically and receives an LMR frame in reply, and measures the frame loss of the path in both directions based on information contained in the LMR frame.

In dual ended ETH-LM, a CCM frame includes the next counter values, that is, the value of the transmission counter at the time of transmission of the CCM frame, that is, TxFCf, the value of the reception counter at the time of reception of the finally received CCM frame, that is, RxFCb, and the value of TxFCf which was carried in the finally received CCM frame, that is, TxFCb. The MEP receiving this CCM frame uses the difference of these values from the previous values and the difference of the value of the reception counter at the time of reception of the CCM frame from the value at the time of the previous reception to calculate the frame loss of the path in both directions so as to thereby calculate the frame losses in both directions at both MEPs.

In single ended ETH-LM, an LMM frame carries the value of the transmission counter at the time of transmission of the LMM frame, that is, TxFCf. Further, the LMR frame in reply to the LMM frame, carries the TxFCf copied from the LMM frame, the value of the reception counter at the time of reception of the LMM frame, that is, RxFCf, and the value of the transmission counter at the time of transmission of the LMR frame, that is, TxFCb. The MEP receiving this LMR frame calculates the frame loss of the path in both directions from the difference of these values from the previous values and the difference of the value of the reception counter at the time of reception of the LMR frame from the value of the previous time of reception.

The above two techniques are common in the fact of making an OAM frame (CCM, LMM, or LMR frame) carry the value of the transmission counter at the time of transmission of that OAM frame itself.

Usually, the generation of the OAM frame and the transmission of the OAM frame are performed by separate functional units operating in parallel. For that reason, after reading out the value of the transmission counter for generation of an OAM frame, there is the possibility of a data frame being transmitted before the OAM frame which carries the read out value is actually transmitted. In other words, there is a possibility of the value of the transmission counter at the time the OAM frame is generated and the value of the transmission counter at the time the OAM frame is actually transmitted not matching. Data frames do not flow at constant periods, so that deviation will not be fixed. Therefore, the difference of the transmission counter value contained in the OAM frame from the previous value might not match the number of data frames actually sent between two OAM frames.

The above Recommendation, page 31, also describes the following as NOTE 1:

"The level of accuracy in the loss measurements is dependent on how frames with ETH-LM information are added to the data stream after the counter values are copied in the ETH-LM information. For example, if additional data frames get transmitted and/or received between the time of reading the counter values and adding the frame with ETH-LM information to the data stream, the counter values copied in ETH-LM information become inaccurate."

Further, there is the following description as a countermeasure:

"However, a hardware-based implementation which is able to add frames with ETH-LM information to the data stream immediately after reading the counter values, provides enhanced accuracy."

However, it is impossible or remarkably difficult to reduce the processing time, from generation of an OAM frame to its transmission, to zero even if realized by hardware, which is liable to invite greater complexity and larger size of the circuit and a drop in the processing speed.

Non-Patent Literature 1: ITU-T Recommendation Y.1731 (8.1)

SUMMARY

According to an aspect of the invention, there is provided a frame loss measurement method comprising counting a number of data frames to be sent from a first node to a second node at the first node by a transmission counter, generating an OAM (operation, administration, and maintenance) frame, which OAM frame includes information relating to the value of the transmission counter when transmitting an OAM frame transmitted previously, at the first node, adding the generated OAM frame to the flow of data frames from the first node to the second node, counting the number of data frames received by the second node among the data frames transmitted from the first node to the second node at the second node by a reception counter, and calculating frame loss of a path from the first node to the second node by at least one of the first and second nodes based on information relating to the value of the transmission counter and information relating to the value of the reception counter contained in the OAM frame.

DESCRIPTION OF EMBODIMENTS

When generating an OAM frame carrying information relating to the value of the transmission counter in this way, by making the OAM frame carry information relating to the value of the transmission counter at the time of transmitting an OAM frame transmitted previously, as mentioned before, the information relating to the value of the transmission counter at the time of transmission of the OAM frame is carried not in that OAM frame itself, but in a later generated OAM frame. Therefore, there is no need to make the time, from generation to transmission of the OAM frame, zero. Further, the information relating to the value of the transmission counter contained in the received OAM frame correctly expresses the state of the transmission counter when the received OAM frame was transmitted previously.

Note that, the "information relating to the value of the transmission counter" may be, for example, the value of the counter itself, but may also be, for example, the difference from the previous time. In the former case, the difference of the transmission counter value from the previous value completely matches the number of data frames transmitted between the previously received OAM frame and that previous previous OAM frame, contained in the received OAM frame, so by comparing the number of data frames actually received between them, it is possible to accurately measure the frame loss.

Below, the single ended and dual ended frame loss measurements, described in the above-mentioned ITU-T Recommendation Y.1371, improved by the embodiments of the invention will be explained as examples, but the embodiments invention is not limited to these. For example, the technique of the present invention may be applied to measurement of the loss of a path set on an IP network by using MPLS (multi protocol label switching).

Figure 1:
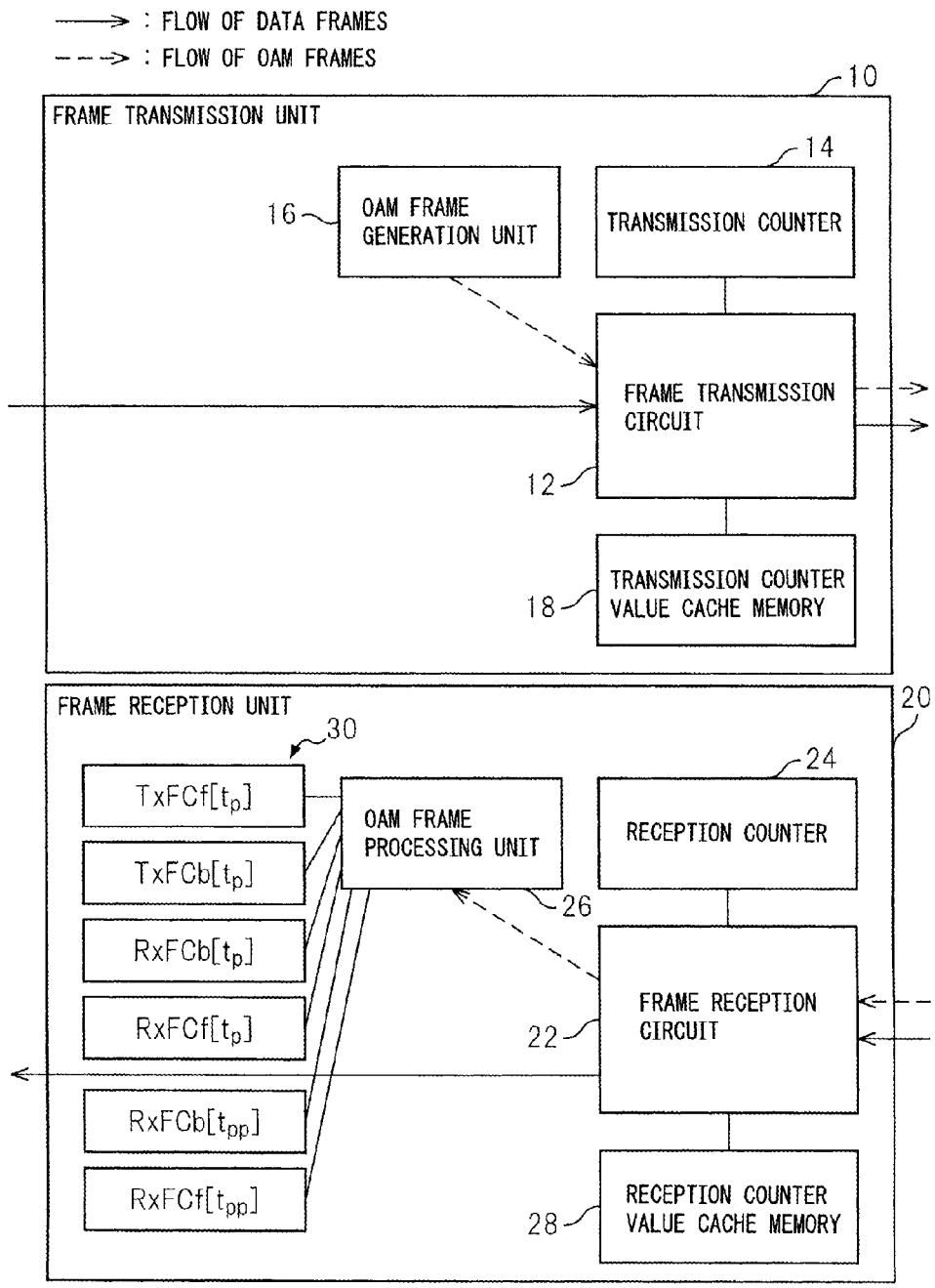
FIG. 1 is a block diagram illustrating a first example of an apparatus for realizing single ended frame loss measurement.

FIG. 1 illustrates a first example of the configuration of an apparatus for realizing single ended frame loss measurement according to an embodiment.

The frame transmission unit 10 is provided with a frame transmission circuit 12 which transmits a data frame or an OAM frame, a transmission counter 14 which counts the number of data frames transmitted from the frame transmission circuit 12, and an OAM frame generation unit 16 which generates an OAM frame (the above-mentioned LMM frame and LMR frame) for frame loss measurement. Each time a data frame is transmitted from the frame transmission circuit 12, the transmission counter 14 is counted up. When a frame loss measurement use OAM frame, generated at the OAM frame generation unit 16, is transmitted from the frame transmission circuit 12, the value of the transmission counter 14 at that time is cached in the transmission counter value cache memory 18. At the time of generating the next OAM frame, the transmission counter value, cached in this transmission counter value cache memory 18, is used. That is, the value of the transmission counter carried in the frame loss measurement use OAM frame becomes the value of the transmission counter when a frame loss measurement use OAM frame was transmitted at the previous time from the frame transmission circuit 12.

The reception unit 20 is provided with a frame reception circuit 22 which receives a data frame or an OAM frame, a reception counter 24 which counts the number of data frames received at the frame reception circuit 22, and an OAM frame processing unit 26 which performs necessary processing when receiving a frame loss measurement use OAM frame. Each time a data frame is received at the frame reception circuit 22, the reception counter 24 is counted up. When a frame loss measurement use OAM frame is received, the value of the reception counter 24, at that time, is cached in the reception counter value cache memory 28. At the time of single ended operation, if the received OAM frame is an LMM frame, the OAM frame processing unit 26 requests the OAM frame generation unit 16 to generate a LMR frame, while if the received OAM frame is an LMR frame, the unit 26 calculates the frame loss. A memory 30 stores the values for calculation of the frame loss.

Figure 2:
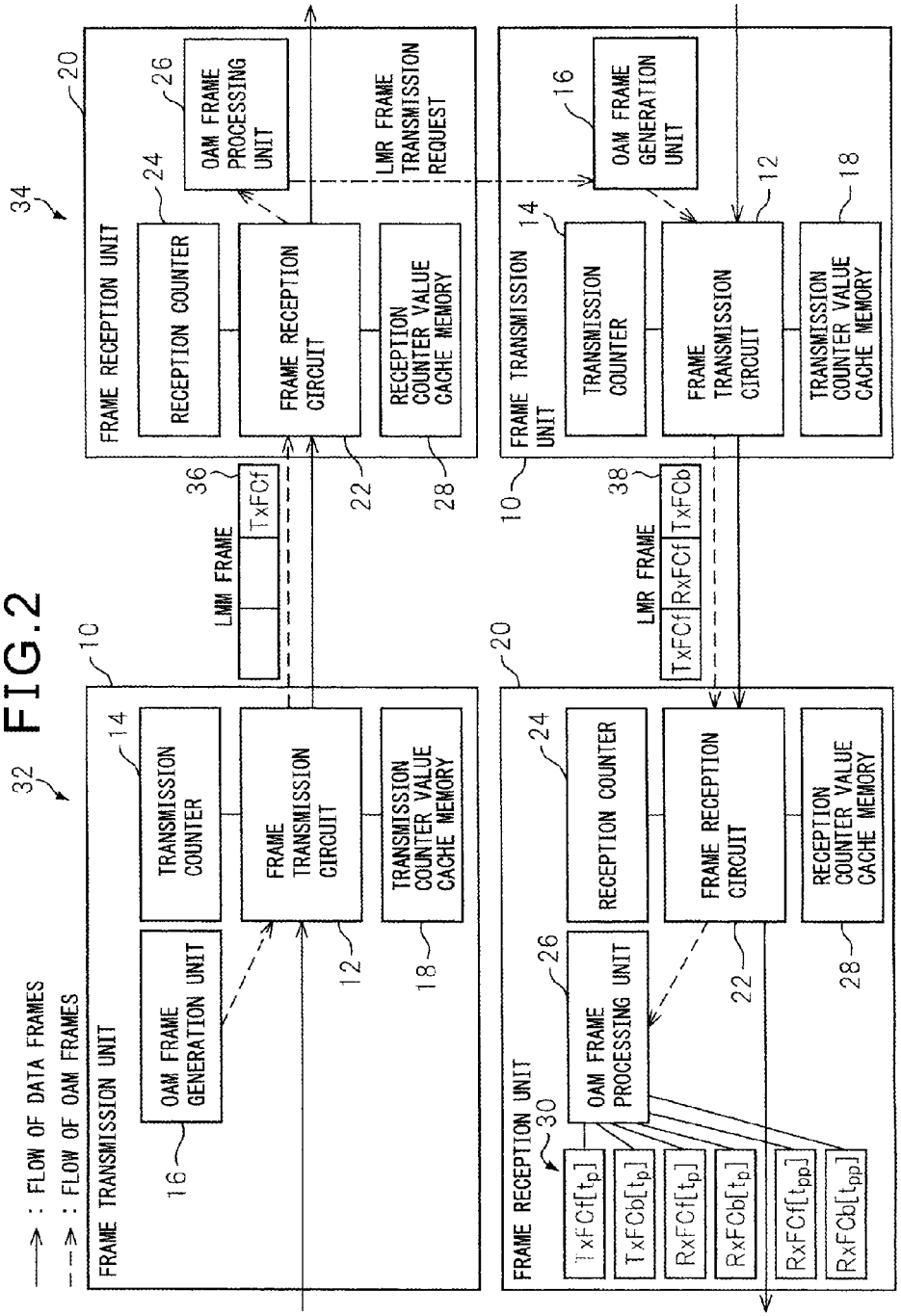
FIG. 2 is a view for explaining the sequence of frame loss measurement performed between apparatuses having the configuration of FIG. 1.

FIG. 2 is a view for explaining the sequence of frame loss measurement by a single ended operation performed between the apparatus 32 and apparatus 34 which respectively have configurations illustrated in FIG. 1. As explained above, in the single ended ETH-LM disclosed in the ITU-T Recommendation Y.1731, one MEP (in FIG. 2, the apparatus 32) periodically sends to another MEP (apparatus 34) an LMM frame 36, receives an LMR frame 38 as a reply to the LMM frame 36, and calculates the frame loss based on the information included in the LMR frame 38 and the information of the reception counter 24. In FIG. 2, the components which are not used in the apparatus 34 in the configuration illustrated in FIG. 1 are not illustrated.

The format of the LMM frame 36 to be sent from the apparatus 32 to the apparatus 34 may be the format described in the ITU-T Recommendation Y.1731, 9.12. However, TxFCf is not the value of the transmission counter 14 at the time of transmission of the LMM frame, but is the value of the transmission counter 14 which had been cached in the transmission counter value cache memory 18 at the time of transmission of the LMM frame, that is, the value of the transmission counter 14 when the one previous LMM frame was transmitted. The format of the LMR frame 38, transmitted from the apparatus 34 to the apparatus 32 in reply to reception of the LMM frame 36, may also be the format described in the ITU-T Recommendation Y.1731, 9.13. However, TxFCb is the value of the transmission counter 14 which had been cached in the transmission counter cache memory 18, that is, the value of the transmission counter 14 at the time of transmitting the one previous LMR frame. RxFCf is the value of the reception counter 24 when receiving the LMM frame 36, that is, as explained later, the value of the reception counter 24 which had been cached in the reception counter value cache memory 28 when receiving the LMM frame 36. TxFCf is a copy from the LMM frame 36.

In FIG. 2, first, the OAM frame generation unit 16 of the apparatus 32 periodically generates an LMM frame. At that time, it reads out the value of the transmission counter 14 at the previous time of transmission of the LMM frame, which had been cached at the transmission counter value cache memory 18, sets the value in the region of TxFCf of the LMM frame, and requests transmission to the frame transmission circuit 12. The frame transmission circuit 12, requested the transmission, transmits the LMM frame 36. The frame reception circuit 22 of the frame reception unit 20 in the apparatus 34 which receives the LMM frame 36 caches the value of the reception counter 24 at the time of reception as RxFCf in the reception counter value cache memory 28 and notifies the OAM frame processing unit 26 of the reception. The OAM frame processing unit 26 receiving the notification requests the OAM frame generation unit 16 of the frame transmission unit 10 to generate and transmit an LMR frame. The OAM frame generation unit 16 receiving the request generates an LMR frame. At that time, the unit 16 reads out the value of the transmission counter 14 which had been cached in the transmission counter value cache memory 18 at the previous time of transmission of the LMR frame and sets the value in the region of TxFCb of the LMR frame 38. Further, the unit 16 reads out the value of the reception counter 24 which had been cached in the reception counter value cache memory 28 of the frame reception unit 20 at the time of reception of the LMM frame, sets the value in the region of RxFCf of the LMR frame 38, copies the value of TxFCf from the received LMM frame 36, and requests transmission the frame transmission circuit 12 to transmit a frame. The frame transmission circuit 12 requested to transmit it then transmits the LMR frame 38.

The frame reception circuit 22 of the frame reception unit 20 in the apparatus 32 receiving the LMR frame 38 caches the value of the reception counter 24 at that time as RxFCb in the reception counter value cache memory 28 and notifies the OAM frame processing unit 26 of the reception. The OAM frame processing unit 26 receiving the notification uses the values in the LMR frame 38 and the values in the memory to calculate the far-end loss (loss of path from apparatus 32 to apparatus 34) and the near-end loss (loss of path from apparatus 34 to apparatus 32) by using the following calculation formula:

Far-end: $|TxFCf[t_c]-TxFCf[t_p]|-|RxFCf[t_p]-RxFCf[t_{pp}]|$

Near-end: $|TxFCb[t_c]-TxFCb[t_p]|-|RxFCb[t_p]|RxFCb[t_{pp}]|$ wherein, the $t_c$ in square brackets indicates that the value is a value carried in an LMR frame 38 or a value at the time of reception of the same, $t_p$ indicates that the value is a value carried in one previous LMR frame or a value at the time of reception of the same, and $t_{pp}$ further indicates that it is a value carried in the previous previous LMR frame 38 or a value at the time of reception of the same. The point of difference from the calculation formula in the single ended ETH-LM described in the ITU-T Recommendation Y.1731, 8.1.2.3 is as follows: That is, the values of TxFCf and TxFCb carried in the LMM frame and LMR frame are values at the times of transmission of the one previous LMM frame and LMR frame, so in keeping with this, for the values of RxFCf and RxFCb at the reception side, the difference is calculated between the value ($t_p$) at the time of reception of one previous LMM frame or LMR frame and the value ($t_{pp}$) at the time of reception of the previous previous LMM frame or LMR frame. Note that, in Y.1731, not the symbol RxFCb, but RxFCl meaning the value of a local counter is used, but in the present Description, the symbol RxFCb is used in the sense of not the value of the counter, but the value of the reception counter at the time of frame reception.

Thereafter, the OAM frame processing unit 26 moves, in the memory 30, the previous values RxFCf[$t_p$] and RxFCb[$t_p$] to the regions of the previous previous values RxFCf[$t_{pp}$] and RxFCb[$t_{pp}$]. Further, the values of TxFCf, TxFCb, and RxFCf which had been carried in the LMR frame are respectively stored in the regions of TxFCf[$t_p$], TxFCb[$t_p$], and RxFCf[$t_p$], and the value of the reception counter value cache memory 28 is stored in the region of RxFCb[$t_p$].

In the above way, the values of TxFCf and TxFCb carried in the LMM frame 36 and LMR frame 38 are not values of the transmission counter 14 at the time of frame generation, but are the values of the transmission counter at the time of transmitting the one previous LMM frame and LMR frame which are cached in the transmission counter value cache memory 18. Therefore, the value of the transmission counter at the time of transmission of the OAM frame is correctly represented. If performing calculations, while considering that the values are one time previous values as in the above way, it is possible to accurately calculate the frame loss.

Figure 3:
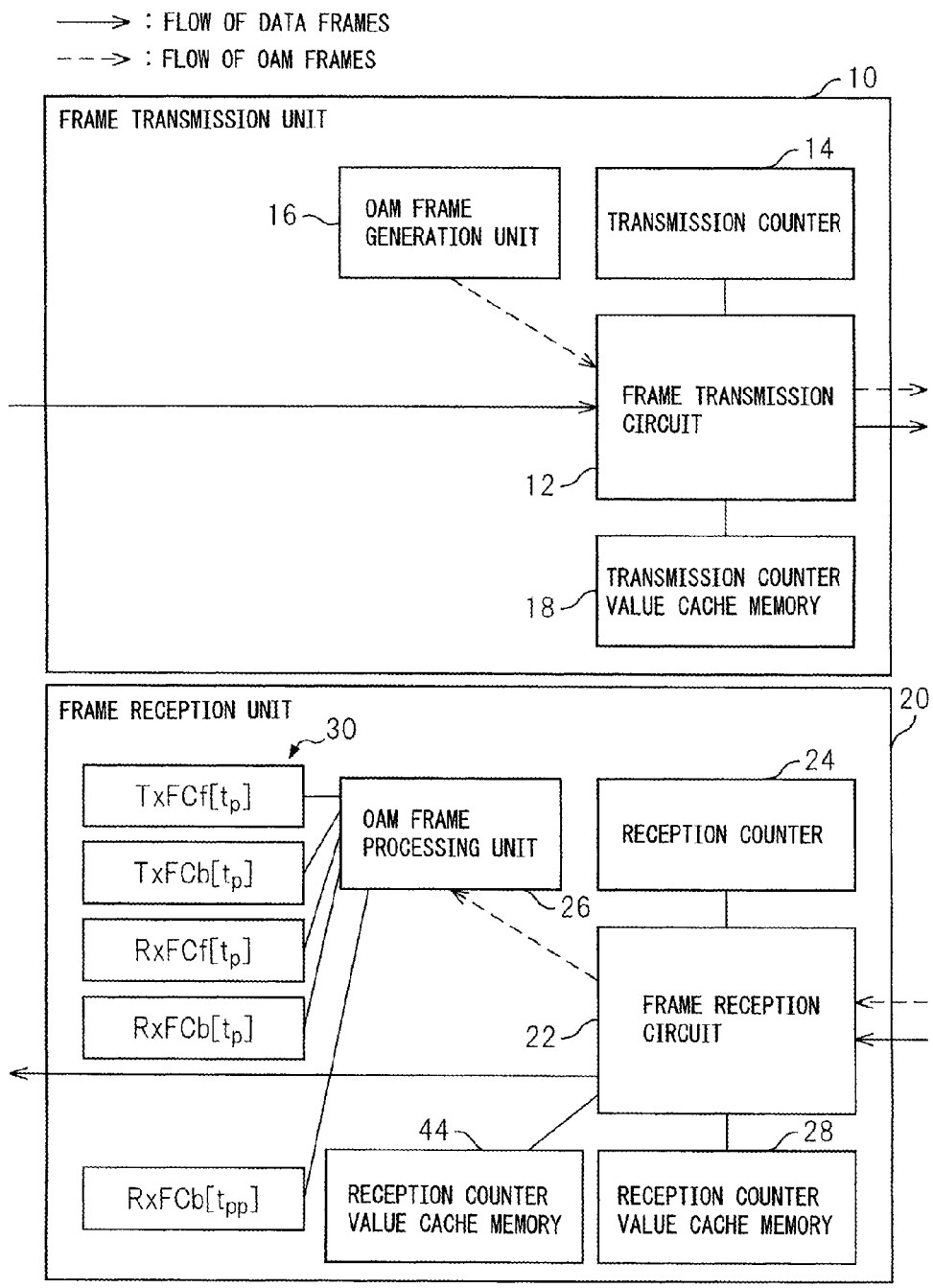
FIG. 3 is a block diagram illustrating a second example of an apparatus for realizing single ended frame loss measurement.
Figure 4:
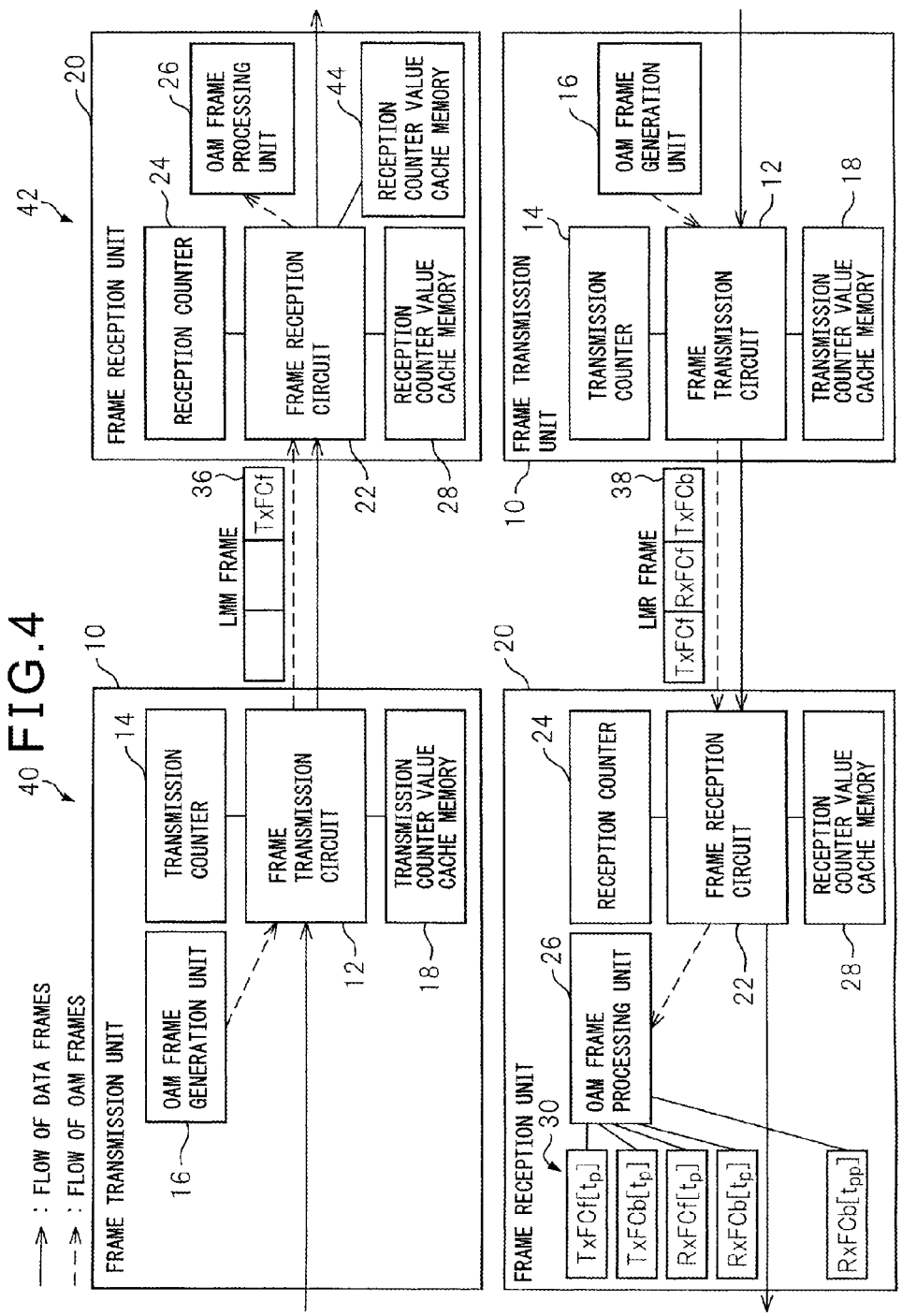
FIG. 4 is a view for explaining the sequence of frame loss measurement performed between apparatuses having the configuration of FIG. 3.

FIG. 3 illustrates a second example of the configuration of an apparatus for realizing single ended frame loss measurement, while FIG. 4 is a view for explaining the sequence of frame loss measurement performed between an apparatus 40 and apparatus 42 having the configuration of FIG. 3. In FIG. 4, the components which are not used among the apparatuses in the configuration illustrated in FIG. 3 are not illustrated.

In this example, the RxFCf carried in the LMR frame 38 as the reply to the LMM frame 36 is not made the value of the reception counter 24 at the time of reception of the LMM frame 36, but is made the value of the reception counter 24 at the time of reception of the one previous LMM frame. For that reason, the apparatus 42 receiving the LMM frame includes a configuration for holding the value of the reception counter at the time of reception of the one previous LMM frame. That is, in addition to the reception counter value cache memory 28, a second reception counter value cache memory 44 is provided, to which cache memory 44 the previous value of the reception counter cache memory 28 is moved every time an LMM frame is received. In this case, the formulas for calculation of the frame loss are:

Far-end: $|TxFCf[t_c]-TxFCf[t_p]|-|RxFCf[t_c]-RxFCf[t_p]|$

Near-end: $|TxFCb[t_c]-TxFCb[t_p]|-|RxFCb[t_p]-RxFCb[t_{pp}]|$

Compared with the above-mentioned formulas of the first example, in the far-end formula, the value of the RxFCf which had been carried in the LMR frame received one time previously, that is, RxFCf[$t_p$], is replaced with the current value, that is, $R_xFC[t_c]$, and RxFCf[$t_{pp}$] is replaced with RxFCf[$t_p$]. For that reason, in the second example, the value of RxFCf [$t_{pp}$] does not have to be stored in the memory 30.

The case where an apparatus of the configuration of FIG. 1 or FIG. 3, according to an embodiment of the present invention, performs frame loss measurement with an apparatus operated based on the ITU-T Recommendation Y.1731 having no transmission counter value cache memory 18, will be explained with reference to FIG. 5.

In this case, the value of TxFCf carried in the LMM frame 36 directed from the apparatus 46 to the apparatus 48 and then returned as a copy from the apparatus 48 by the LMR frame 38 becomes the value at the time of transmission of the one previous LMM frame according to the present embodiment, so in the same way as the above-mentioned first example, Far-end: $|TxFCf[t_c]-TxFCf[t_p]|-|RxFCf[t_p]-RxFCf[t_{pp}]|$ may be used to accurately measure the far-end frame loss.

On the other hand, the value of TxFCb, carried in the LMR frame 38 directed from the apparatus 48 to the apparatus 46, becomes the value of the transmission counter 14 which is not the value at the time of transmission of the LMR frame, but at the time of generation, so as explained above there is a problem in accuracy, but the formula described in Y.1731 of Near-end: $|TxFCb[t_c]-TxFCb[t_p]|-|RxFCb[t_c]-RxFCb[t_p]|$ may be used to measure the near-end loss.

Figure 5:
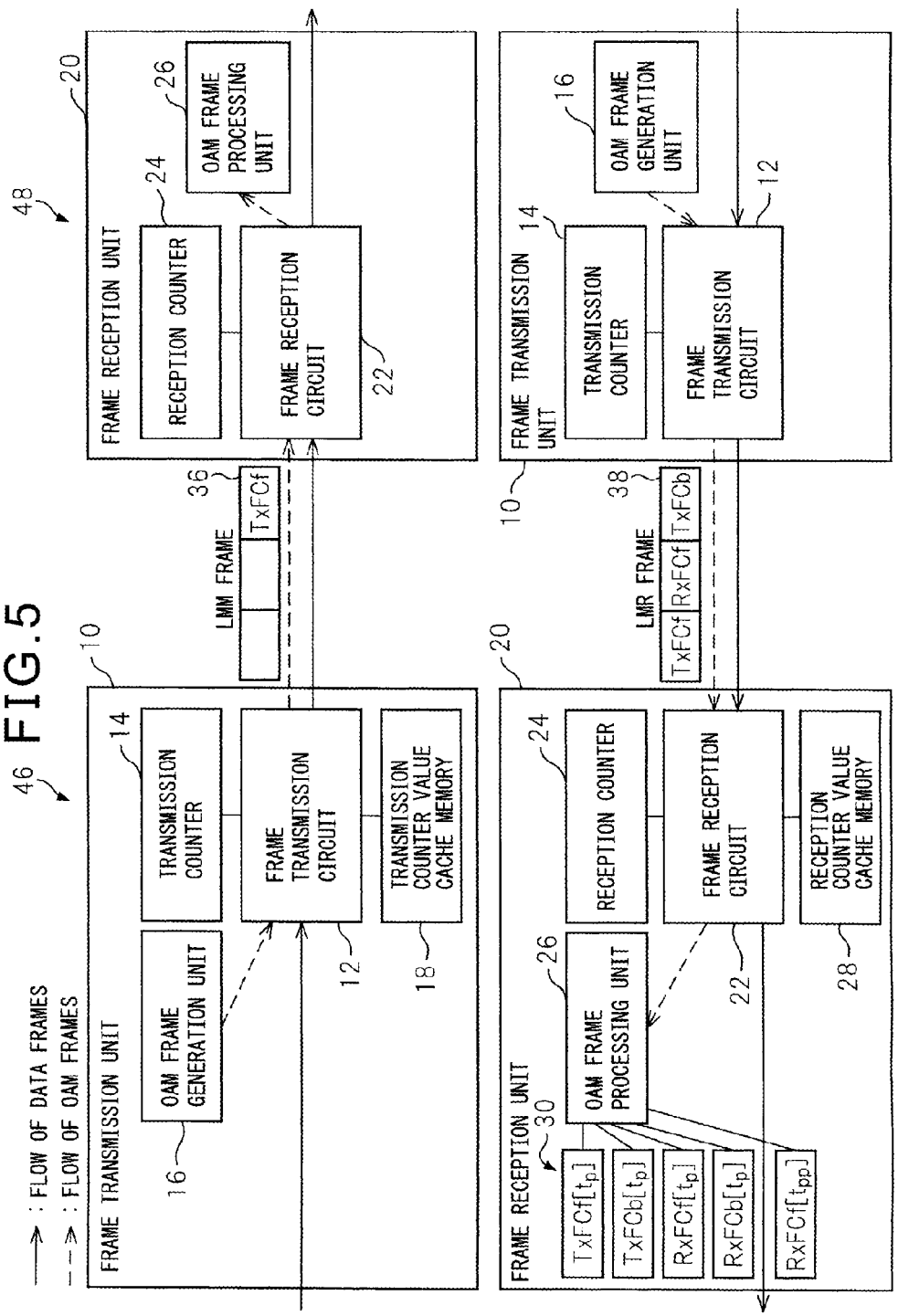
FIG. 5 is a view for explaining the sequence of frame loss measurement performed between apparatuses based on ITU-T Recommendation Y.1731.

In this case, as will be understood if comparing the configuration of the apparatus 46 illustrated in FIG. 5 with that of FIG. 1, in the apparatus 46, the memory 30 does not store the value of $RxFCb[t_{pp}]$.

That is, the apparatus of the present invention enables single ended frame loss measurement even with an apparatus based on Y.1731. In this case, far-end frame loss can be accurately measured. For near-end frame loss, while there is a problem in accuracy, measurement itself is possible.

Figure 6:
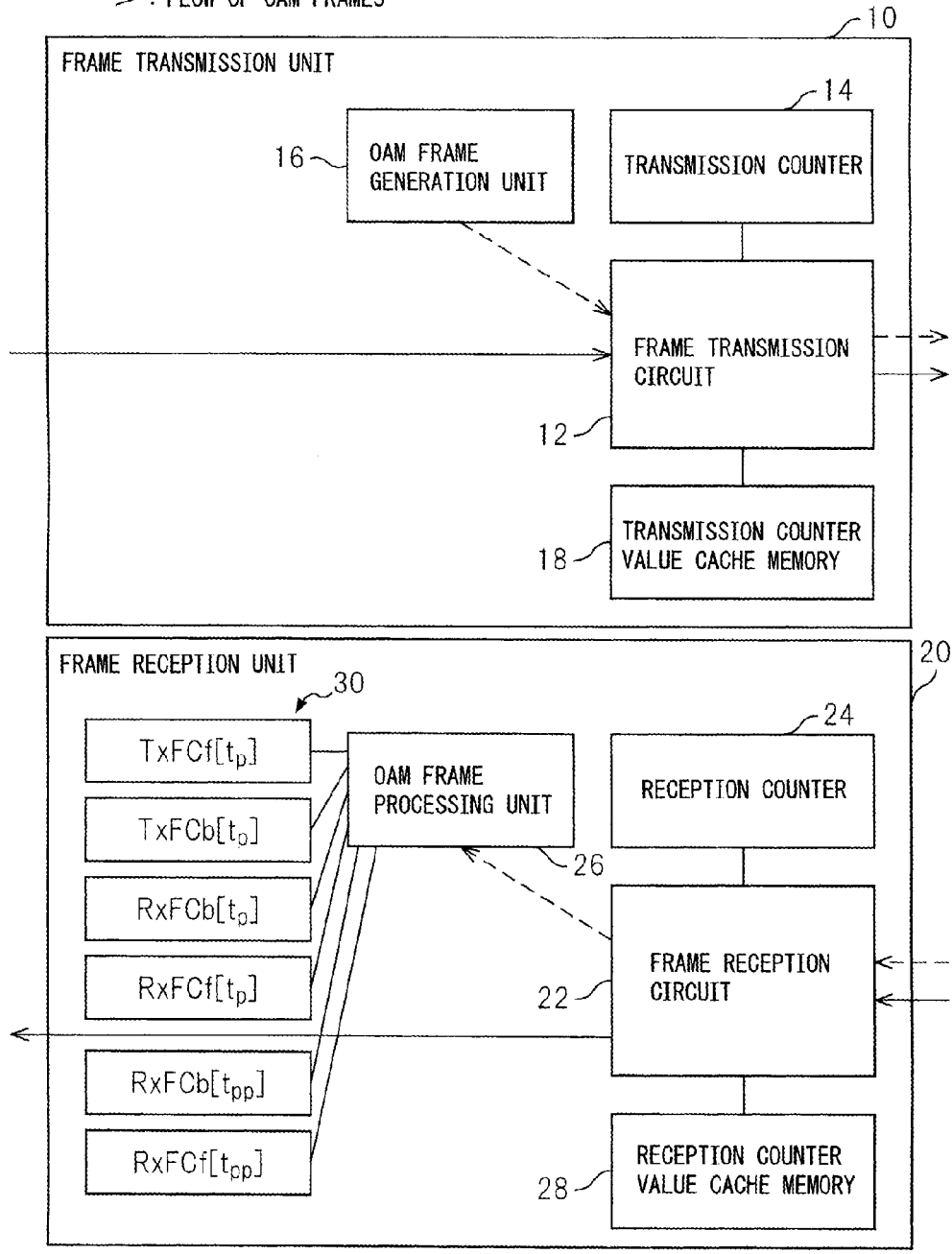
FIG. 6 is a block diagram illustrating a first example of an apparatus for realizing dual ended frame loss measurement.
Figure 7:
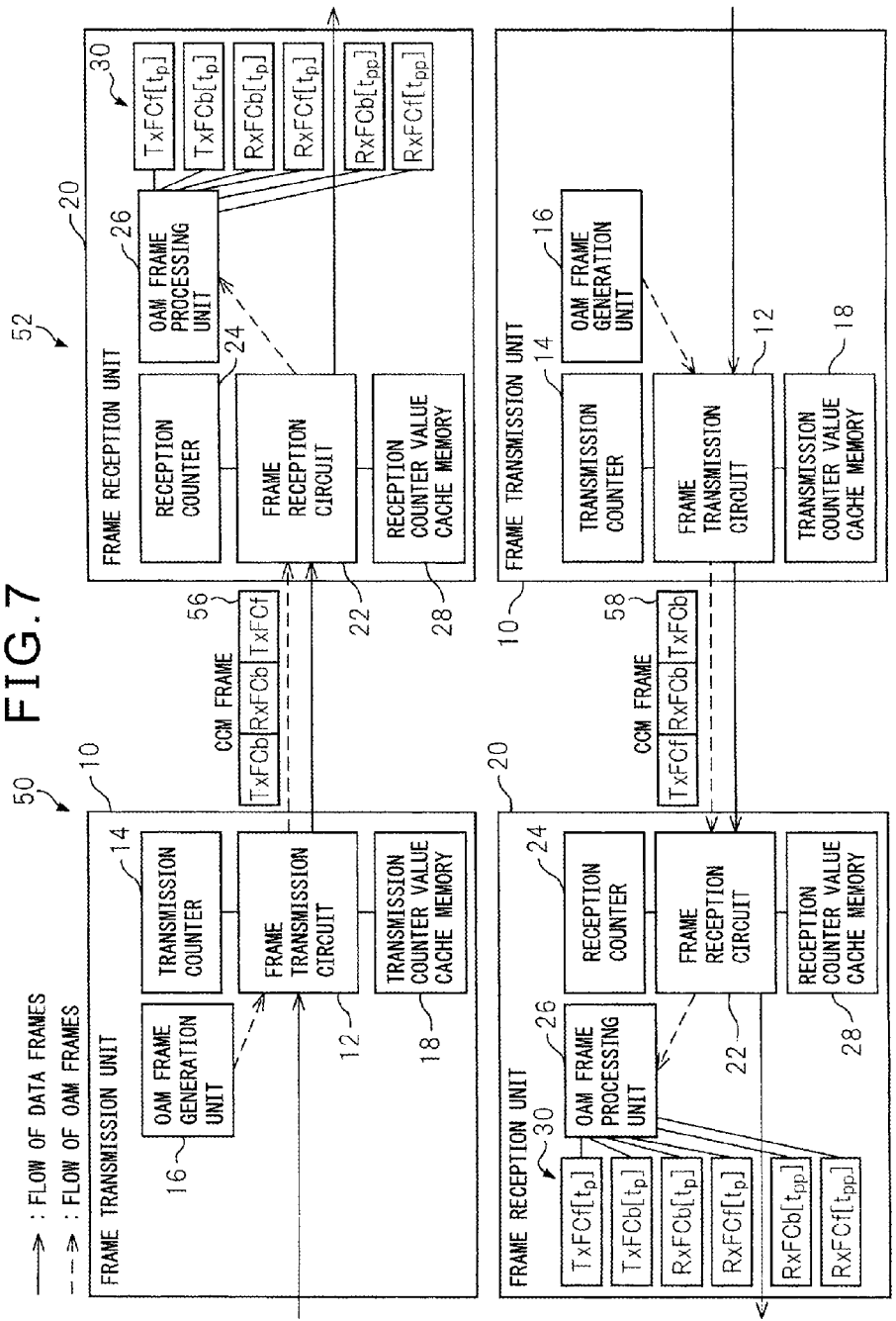
FIG. 7 is a view for explaining the sequence of frame loss measurement performed between apparatuses having the configuration of FIG. 6.

FIG. 6 illustrates the configuration of a first example of an apparatus for realizing dual ended frame loss measurement, while FIG. 7 is a view for explaining the sequence of frame loss measurement performed between the apparatus 50 and apparatus 52 having the configuration of FIG. 6.

As explained above, the "dual ended frame loss measurement" means measurement of the frame loss in both directions at both MEPs by having both MEPs send the other an OAM frame constantly at a predetermined period. As the OAM frame, a CCM frame of the format described in Y.1731, 9.2 can be used.

In FIG. 7, the OAM frame generation unit 16 of the frame transmission unit 10 in the apparatus 50 generates a CCM frame 56 at a predetermined cycle. At this time, the OAM frame generation unit 16 sets the value of the transmission counter 14 cached in the transmission counter value cache memory 18 at the time of the transmission of the previous CCM frame, in the region of TxFCf.

Furthermore, the OAM frame generation unit 16 in the apparatus 50 sets both the value of TxFCf, which had been carried in the CCM frame 58 finally received from the apparatus 52 and held in the memory 30 of the frame reception unit 20, that is, the value of $TxFCf[t_p]$, and the value of the reception counter 24 at the time of receiving that CCM frame 58, that is, the value of $RxFCf[t_p]$, in the regions of TxFCb and RxFCb respectively. Thereafter, the OAM frame generation unit 16 in the apparatus 50 requests transmission to the frame transmission circuit 12. The frame transmission circuit 12 in the apparatus 50, receiving the request for transmission, transmits the CCM frame 56. At this time, the frame transmission circuit 12 caches the value of the transmission counter 14 in the transmission counter value cache memory 18.

The frame reception circuit 22 of the frame reception unit 20 in the apparatus 52, receiving the CCM frame 56, caches the value of the reception counter 24 in the reception counter value cache memory 28 and notifies the OAM frame processing unit 26 of the reception. The OAM frame processing unit 26 receiving the notification calculates the frame loss by using the following calculation formulas:

Far-end: $|TxFCb[t_c]-TxFCb[t_p]|-|RxFCb[t_p]-RxFCb[t_{pp}]|$

Near-end: $|TxFCf[t_c]-TxFCf[t_p]|-|RxFCf[t_p]-RxFCf[t_{pp}]|$

The point of difference from the calculation formula in the dual ended ETH-LM described in the ITU-T Recommendation Y.1731, 8.1.1.2 is that the values of TxFCf and TxFCb carried in the CCM frame 56 are values at the times of transmission of the one previous CCM frame, so in keeping with this, for the values of RxFCf and RxFCb, the difference is calculated between the value ($t_p$) at the time of reception of one previous CCM and the value ($t_{pp}$) at the time of reception of one previous previous CCM frame. Note that, in Y.1731, not the symbol RxFCb, but RxFCl meaning the value of a local counter is used, but in the present Description, the symbol RxFCf is used in the sense of not the value of the counter, but the value of the reception counter at the time of frame reception. Thereafter, the OAM frame processing unit 26 in the apparatus 52 moves the previous values $RxFCb[t_{pp}]$ and $RxFCf[t_{pp}]$ respectively to the regions of $RxFCb[t_{pp}]$ and $RxFCf[t_{pp}]$ in the memory 30. Further, the OAM frame processing unit 26 in the apparatus 52 stores the values of the TxFCf, TxFCb, and RxFCb, which had been carried in the CCM frame 56, in the regions of $TxFCf[t_p]$, $TxFCb[t_p]$, and $RxFCb[t_p]$ respectively and stores the value stored in the reception counter value cache memory 28 in the region of $RxFCf[t_p]$.

The above was the processing relating to the CCM frame 56 transmitted from the apparatus 50 to the apparatus 52, but the exactly same processing is performed for the CCM frame 58 transmitted from the apparatus 52 to the apparatus 50. That is, at the time of generation of CCM frame by the OAM frame generation unit 16 of the frame transmission unit 10 in the apparatus 52, the value of $TxFCf[t_p]$ and the value of $RxFCf[t_p]$ stored in the memory 30 of the frame reception unit 20 in the apparatus 52 are used. Further, the OAM frame processing unit 26 in the apparatus 50 calculates the frame loss of the path in both directions by using the above-mentioned formulas. After this, the OAM frame generation unit 16 in the apparatus 50 uses, as explained above, the value of $TxFCf[t_p]$ and the value of $RxFCf[t_p]$ stored in the memory 30 in the apparatus 50 for generation of the CCM frame.

Figure 8:
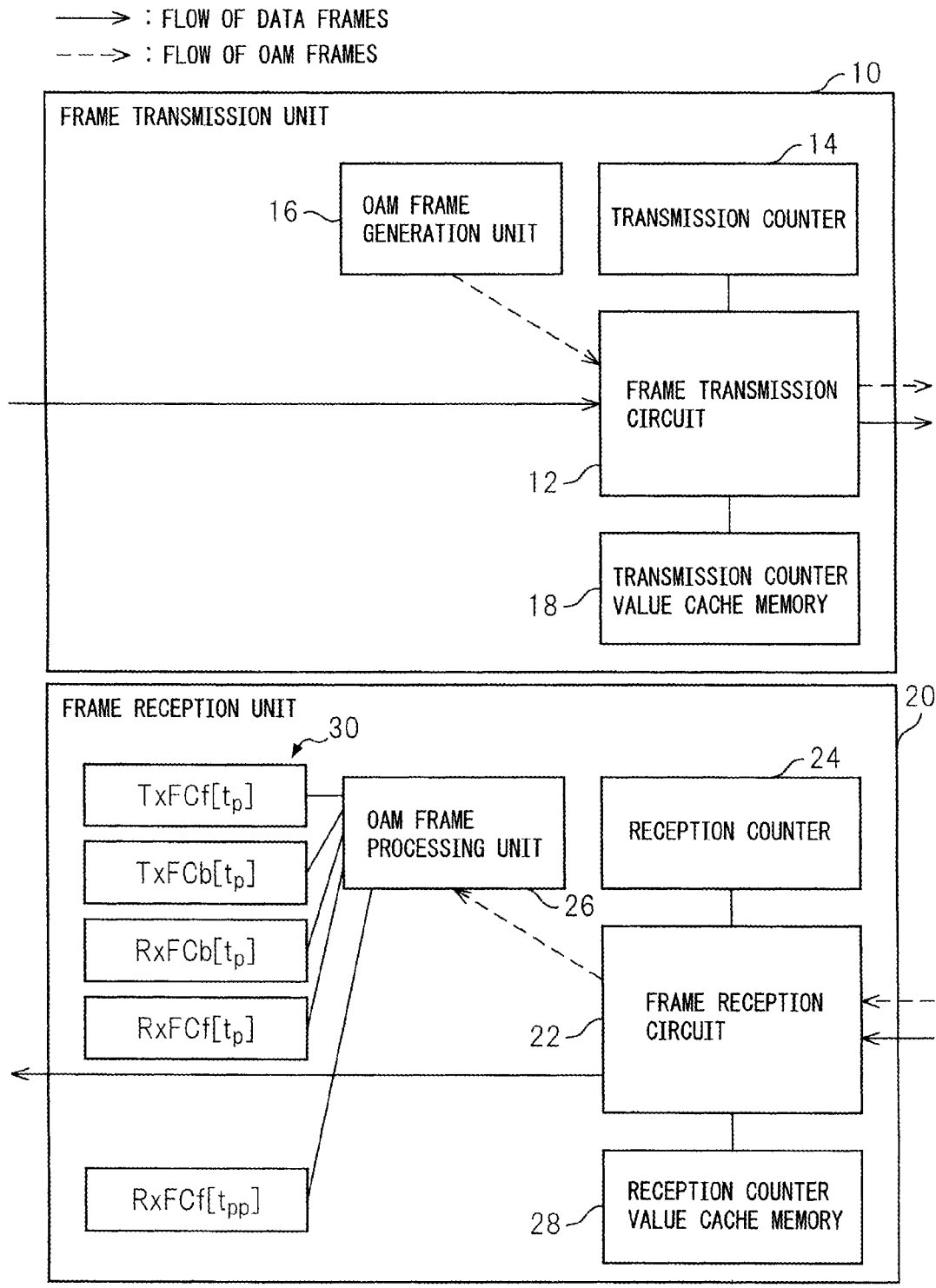
FIG. 8 is a block diagram illustrating a second example of an apparatus for realizing dual ended frame loss measurement.
Figure 9:
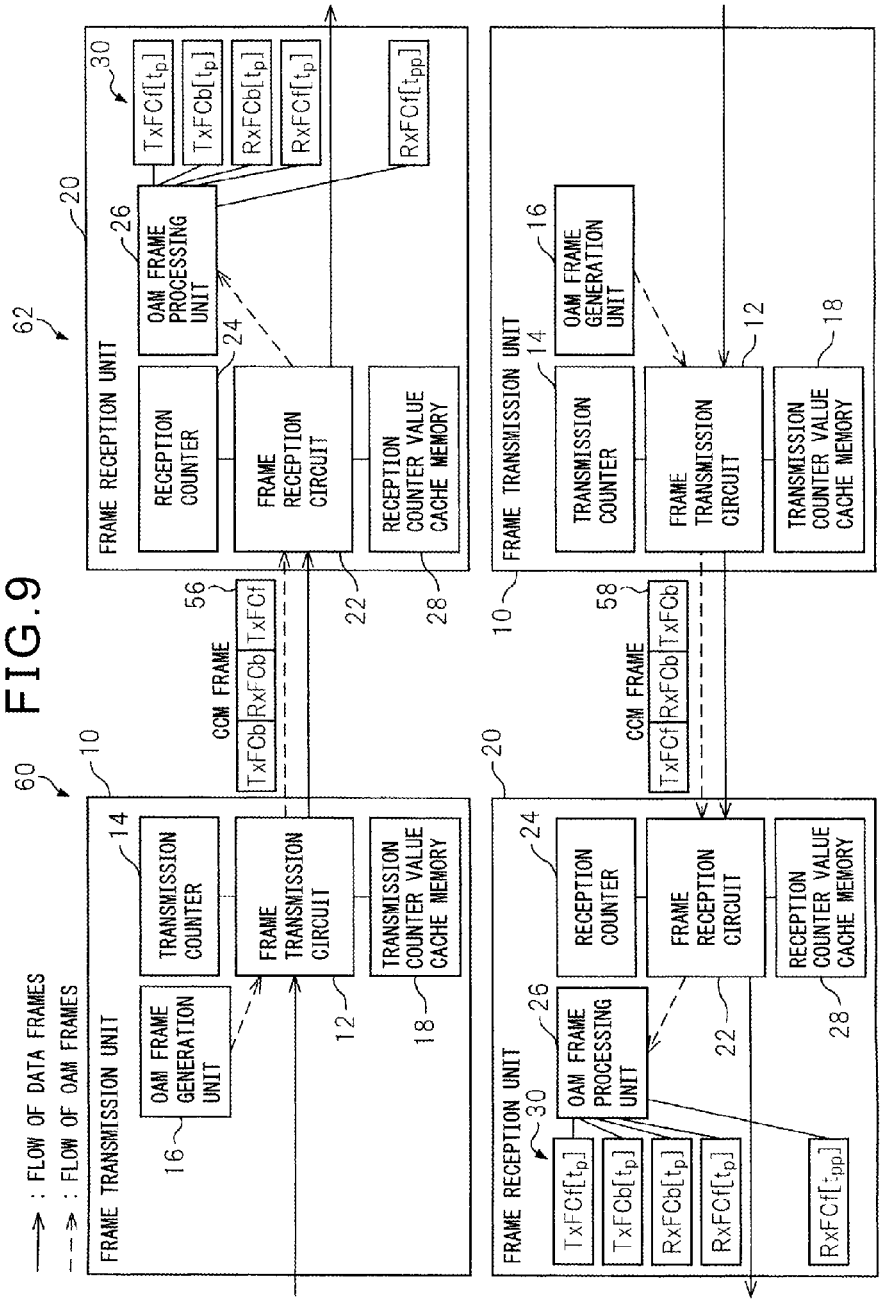
FIG. 9 is a view for explaining the sequence of frame loss measurement performed between apparatuses having the configuration of FIG. 8.

FIG. 8 illustrates the configuration of a second example of an apparatus for realizing dual ended frame loss measurement, while FIG. 9 is a view for explaining the sequence of frame loss measurement performed between the apparatuses 60, 62 having the configuration of FIG. 8.

In this example, in the same way as the second example of single ended frame loss measurement explained with reference to FIG. 3 and FIG. 4, the following processing is performed. That is, in this example, the value of RxFCb carried in the CCM frame 56 is not made the value $RxFCf[t_p]$ of the reception counter at the time of receiving the finally received CCM frame, but is made the $RxFCf[t_{pp}]$ of the reception counter at the time the previous previous CCM frame is received. The calculation formulas of the frame loss in this case are:

Far-end: $|TxFCb[t_c]-TxFCb[t_p]|-|RxFCb[t_c]-RxFCb[t_p]|$

Near-end: $|TxFCf[t_c]-TxFCf[t_p]|-|RxFCf[t_p]-RxFCf[t_{pp}]|$

Compared with the dual ended formulas of the first example, in the far-end formula, the value of RxFCb which had been carried in the CCM frame received one previous time ago, that is, RxFCb[$t_p$], is replaced with the value of RxFCb which had been carried in the finally received CCM frame, that is, RxFCb[$t_c$], and RxFCb[$t_{pp}$] is replaced with RxFCb[$t_p$]. For that reason, storage of RxFCb[$t_{pp}$] becomes unnecessary. The rest is the same as in the first example.

The apparatuses in the embodiments explained above may be realized by hardware or by software.

All examples and conditional language recited herein are intended for pedagogical purposes to aid the reader in understanding the invention.

The invention claimed is:

1. A frame loss measurement method comprising:
   transmitting a first OAM frame;
   transmitting a second OAM frame, which includes information relating to a number of data frames transmitted before transmitting the first OAM frame; and
   calculating frame loss based on information extracted from the second OAM frame and a number of received data frames among the data frames transmitted before transmitting the first OAM frame.

2. The method according to claim 1,
   wherein said method further comprises counting transmitted data frames by a transmission counter, and
   wherein the second OAM frame contains a first count value of the transmission counter when the first OAM frame is transmitted, as a part of said information.

3. The method according to claim 2,
   wherein said method further comprises transmitting a third OAM frame before transmitting the first OAM frame,
   wherein the first OAM frame contains a second count value of the transmission counter when the third OAM frame is transmitted, and
   wherein calculating said frame loss includes calculating frame loss using a difference of the first count value from the second count value.

4. The method according to claim 2,
   wherein said first and second OAM frames are transmitted in a first direction,
   wherein said method further comprises
      transmitting a third OAM frame in the first direction before transmitting the first OAM frame, and
      transmitting OAM frames in a second direction opposite to the first direction,
   wherein the first OAM frame contains a second count value of the transmission counter when the third OAM frame is transmitted,
   wherein said OAM frames transmitted in the second direction contain the first count value and the second count value, and
   wherein calculating said frame loss includes calculating the frame loss using a difference of the first count value from the second count value, both of which count values are contained in said OAM frames transmitted in the second direction.

5. The frame loss measurement method according to claim 1, wherein the information is related to number of data frames between OAM frames.

6. The frame loss measurement method according to claim 1,
   wherein said method further comprises:
      counting a number of data frames transmitted between OAM frames,
      counting a number of data frames received between OAM frames,
   wherein the information is related to a count value of data frames transmitted between OAM frames, and
   wherein the frame loss is calculated based on a count value of data frames received between OAM frames and the information extracted from the second OAM frame.

7. A frame loss measurement system comprising:
   a first node comprising a transmitter configured to transmit a first OAM frame and a second OAM frame, which includes information relating to number of data frames transmitted before transmitting the first OAM frame;
   a second node comprising a receiver configured to receive the first OAM frame and the second OAM frame; and
   a frame loss calculator configured to calculate frame loss of a path from the first node to the second node by at least one of the first and second nodes based on information extracted from the second OAM frame and a number of received data frames among the data frames transmitted before transmitting the first OAM frame.

8. The system according to claim 7,
   wherein said first node further comprises a transmission counter counting data frames transmitted from the first node to the second node, and
   wherein the second OAM frame contains a first count value of the transmission counter, as a part of said information relating to the number of the data frames transmitted before transmitting the first OAM frame.

9. The system according to claim 8,
   wherein said transmitter is further configured to transmit a third OAM frame before transmitting the first OAM frame,
   wherein the first OAM frame contains a second count value of the transmission counter when the third OAM frame is transmitted, and
   wherein the frame loss calculator is configured to calculate the frame loss using a difference of the first count value from the second count value.

10. The system according to claim 8,
    wherein said transmitter is further configured to transmit a third OAM frame before transmitting the first OAM frame,
    wherein the first OAM frame contains a second count value of the transmission counter when the third OAM frame is transmitted,
    wherein said second node further comprises a second transmitter configured to transmit OAM frames containing the first count value and the second count value,
    wherein said first node further comprises a second receiver configured to receive the OAM frames transmitted from the second node, and
    wherein said frame loss calculator is configured to calculate the frame loss using a difference of the first count value from the second count value, both of which count values are contained in said OAM frames received by the second receiver.

11. The frame loss measurement system according to claim 7, wherein the information is related to number of data frames between OAM frames.

12. The frame loss measurement system according to claim 7,
    wherein said system further comprises:
       a first counter configured to count a number of data frames transmitted between OAM frames,
       a second counter configured to count a number of data frames received between OAM frames,
    wherein the information is related to a count value of data frames transmitted between OAM frames, and wherein the frame loss is calculated based on a count value of data frames received between OAM frames and the information extracted from the second OAM frame.

13. A frame loss measurement apparatus comprising:
a receiver configured to receive a first OAM frame and a second OAM frame, which includes information relating to a number of data frames transmitted before transmitting the first OAM frame; and
a calculator configured to calculate frame loss based on information extracted from the second OAM frame and a number of received data frames among the data frames transmitted before transmitting the first OAM frame.

14. The apparatus according to claim 13,
wherein the second OAM frame contains a first count value of a transmission counter, when the first OAM frame is transmitted, as a part of said information, and
wherein said transmission counter is configured to count transmitted data frames.

15. The apparatus according to claim 14,
wherein the receiver is further configured to receive a third OAM frame transmitted before the first OAM frame,
wherein the first OAM frame contains a second count value of the transmission counter when the third OAM frame is transmitted, and
wherein the calculator is configured to calculate the frame loss using a difference of the first count value from the second count value.

16. The apparatus according to claim 14, wherein said apparatus further comprising:
a reception counter counting data frames received,
a first reception counter value cache memory caching the count value of said reception counter when said first or second OAM frame is received, and
a second reception counter value cache memory caching the previous count value of the first reception counter value cache memory when the first or second OAM is received.

17. The frame loss measurement apparatus according to claim 13, wherein the information is related to number of data frames between OAM frames.

18. The frame loss measurement apparatus according to claim 13,
wherein said apparatus further comprises:
a first counter configured to count a number of data frames transmitted between OAM frames,
a second counter configured to count a number of data frames received between OAM frames,
wherein the information is related to a count value of data frames transmitted between OAM frames, and
wherein the frame loss is calculated based on a count value of data frames received between OAM frames and the information extracted from the second OAM frame.

* * * * *